United States Patent

[11] 3,602,648

[72] Inventors Roger E. Holtz
Indianapolis, Ind.;
John A. Markevich, Elizabeth, N.J.

[21] Appl. No. 883,073
[22] Filed Dec. 8, 1969
[45] Patented Aug. 31, 1971
[73] Assignee Bell Telephone Laboratories, Incorporated
Murray Hill, N.J.

[54] SUBSCRIBER TELEPHONE CIRCUIT
12 Claims, 5 Drawing Figs.

[52] U.S. Cl. .......... 179/81 A, 179/170.8
[51] Int. Cl. .......... H04b 3/24, H04m 1/58
[50] Field of Search .......... 179/81 A, 81 B, 170 NC, 170.8, 170.2

[56] References Cited

UNITED STATES PATENTS

| | | | |
|---|---|---|---|
| 3,440,356 | 4/1969 | Lebrun .......... | 179/81 A |
| 3,448,217 | 6/1969 | Leman et al. .......... | 179/81 B |
| 3,462,560 | 8/1969 | Holzman .......... | 179/81 A |

*Primary Examiner*—Kathleen H. Claffy
*Assistant Examiner*—William A. Helvestine
*Attorneys*—R. J. Guenther and Edwin B. Cave

ABSTRACT: In a telephone set speech circuit employing a nonreactive hybrid network the transmitter branch and the receiver branch each includes a respective loop equalizer in the form of an operational amplifier with a feedback control path which includes a path to ground by way of a capacitive element. In the receiver branch a switch responsive to a preselected signal level in the transmitter branch disconnects the feedback path of the operational amplifier from the capacitive element which provides protection against singing and which helps to ensure a relatively flat frequency response for sidetone irrespective of loop length.

INVENTORS: R. E. HOLTZ
J. A. MARKEVICH
BY
ATTORNEY

SUBSCRIBER TELEPHONE CIRCUIT

BACKGROUND OF THE INVENTION

1. Field of the Invention

This invention relates to speech networks for subscriber telephone sets and more particularly to speech networks which include equalization circuits.

2. Description of the Prior Art

In telephony it is obviously undesirable to permit the distance between a calling and a called subscriber to dictate the level and quality of transmission. The problem actually has two primary aspects. The first concerns transmission losses or distortions that arise from differences in transmission path length, whether microwave or cable, between central offices; this part of the problem is conventionally met by the use of repeaters that boost or amplify and by the use of equalization networks that compensate either for differences in level, or frequency attenuation, or both.

The second aspect of the problem concerns the need to compensate for differences in individual subscriber loop length, the transmission path between the subscriber and the central office. In the prior art this problem has been met by the inclusion of an equalizer circuit or circuits as a part of the voice network of telephone subscriber sets. U.S. Pat. No. 2,645,681 issued to E. I. Green on July 14, 1953 is illustrative. Green discloses an equalizer arrangement that employs two negative temperature coefficient resistance elements, such as thermistors for example, one in shunt connection with the receiver and one in shunt connection with the transmitter of a telephone station set. Both of these elements are thermally coupled to circuit means, such as a filament, and the heat energy transfer to the shunt elements from the filament varies inversely with the resistance of the telephone loop. Variants of Green's equalizer are shown in U.S. Pat. No. 2,604,543 issued July 22, 1952 to W. D. Goodale, Jr., and in U.S. Pat. No. 2,732,436 issued Jan. 24, 1956 to A. J. Aikens, N. Botsford, A. P. Boysen, Jr., E. Dietze, W. D. Goodale, Jr., and A. H. Inglis.

Although prior art equalizers of the type indicated above have proven to be generally adequate for their intended purpose, the equalization accomplished lacks flexibility and is therefore less than ideal in performance, particularly on loop lengths that are unusually short or exceptionally long. Moreover, prior art equalizers have been designed for compatibility with conventional telephone set components and networks in mind, such as carbon microphones and inductance coil hybrids for example, rather than being designed for compatibility with electromagnetic transducers and solid state—thin film hybrids. Additionally, prior art arrangements make no use of the increased scope and flexibility of equalizers potentially made available when ready means of amplification are at hand. Furthermore, equalization has heretofore been regarded as a separate applique type of function without regard to the possible advantages of fully exploiting the interaction of that function with other speech network functions, such as the provision of sidetone, for example.

Accordingly, a broad object of the invention is to improve the equalization circuits in subscriber telephone set speech networks.

A more specific object is to enhance equalization in telephone speech networks connected to particularly long subscriber loops.

SUMMARY OF THE INVENTION

The foregoing objects and additional objects are achieved in accordance with the principles of the invention by employing a respective operational amplifier in both the transmit and receive branches of a telephone set speech network to achieve equalization. In accordance with one aspect of the invention each of the operational amplifiers employs a substantially resistive feedback control circuit, and the resistance therein is varied in accordance with the power received over the loop, which power is of course a function of loop length.

In one illustrative embodiment, equalizer circuits in accordance with the invention are incorporated in a fully integrated or "electronic" speech network employing a noninductive hybrid circuit and electromagnetic transducers. Automatic gain control amplifier circuits are employed on both the transmit and receive paths and in the transmit circuit both preamplification and noise discrimination are utilized. The dial circuit, which employs selective resistance-capacitance combinations for the generation of tone signals, has its output directed through the transmit equalizer circuit to ensure uniform dial signal level on varying subscriber loop lengths.

In accordance with an important feature of the invention, a capacitor is connected between the feedback path of each of the operational amplifier equalizers and a source of reference potential such as ground. This connection ensures proper compensation for frequency twist and serves to boost higher frequencies on longer loop lengths to offset the correspondingly higher levels of high frequency attenuation. In the equalizer network for the receive path, a switch is positioned at one of the terminals of the capacitor, the switch being responsive to a preselected signal level in the transmit path. In this way, the capacitor is switched out of the circuit in the transmit mode and as a result, the normally rising frequency characteristic of sidetone with increased loop length is substantially reduced. Without this feature of the invention, sidetone would have a substantially greater rise in its frequency spectrum with increasing loop lengths.

DETAILED DESCRIPTION

Figure 1:
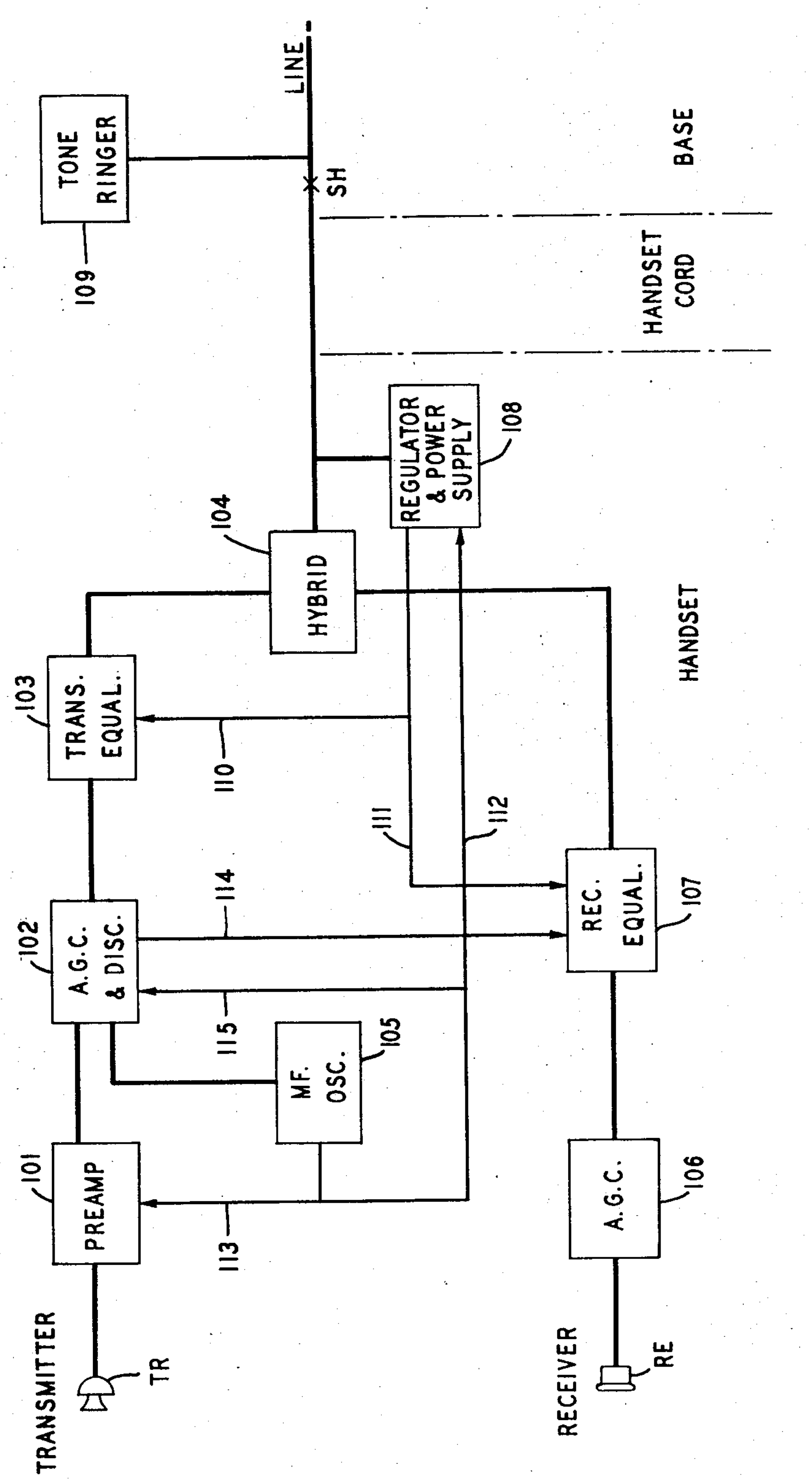
FIG. 1 is a block diagram of the speech circuit of a subscriber's telephone set in accordance with the invention.

In the block diagram of a circuit in accordance with the invention as shown in FIG. 1, the heavy lines indicate speech or dial signal transmission paths, whereas the light lines indicate conducting paths for DC control current. In FIG. 1 the transmitter TR is preferably of the electromagnetic, variable reluctance-type with an output of approximately −70 dbV for a normal speech input. The output of the transmitter TR is applied to the input of a preamplifier circuit 101 which provides suitable frequency shaping and raises the signal to workable levels. Any one of a wide variety of prior art circuits are suitable to perform these functions. From the preamplifier 101 the shaped and boosted signal is applied to the input of a combination automatic gain control (AGC) circuit and discriminator or noise suppressor. These functions also may be performed with any one of a number of prior art circuits, such as a balanced variolosser, employing saturated transistors or varistors as the variable elements. The variolosser is fed differentially from the preamplifier 101 and ideally terminates in a differential amplifier with good common mode rejection. This arrangement maintains balance in the variolosser without the use of transformers so that control current transients do not appear in the output signal. Noise suppression switching is used to effect the discriminator or noise suppression functions. The switching is based on the input level to the circuit, which requires a forward-acting control, whereas AGC switching is based on the output level requiring a reverse-acting control. Variolossers and noise suppression circuits of the general type indicated are conventionally employed in loudspeaking or speakerphone telephone sets as shown for example in U.S. Pat. No. 3,372,239 issued to F. J. Clement on Mar. 5, 1968.

Figure 2:
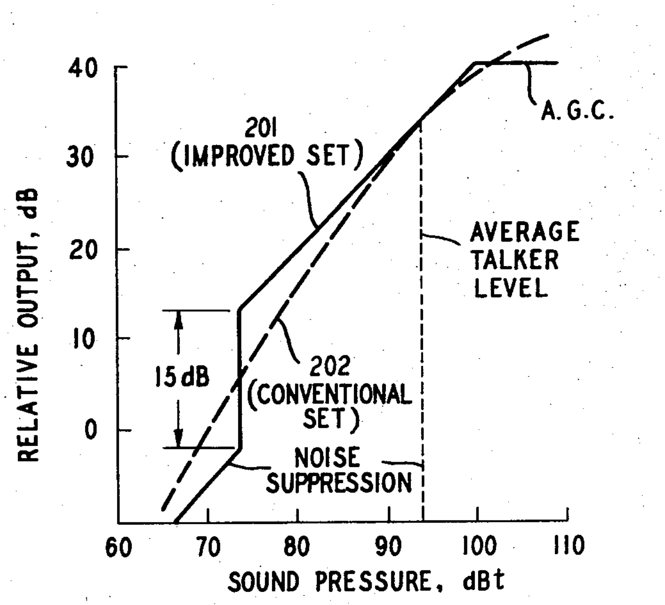
FIG. 2 is a plot of the transmission characteristics of the circuit shown in FIG. 1 in terms of acoustic input versus electrical output.

The combined effect of noise suppression and AGC action in accordance with the invention is illustrated by the plot shown in FIG. 2. The dotted curve 202 illustrates the characteristics of a conventional carbon microphone telephone set, and the solid curve illustrates the characteristics of the set of FIG. 1. As shown, the transmit channel gain for signals below a preselected sound pressure level is reduced 15 db. below normal gain. The sharp cutoff at the top end of the curve that results from AGC action reduces the signal level for exceptionally loud talkers by limiting the upper tail of the talker volume distribution.

Figure 3:
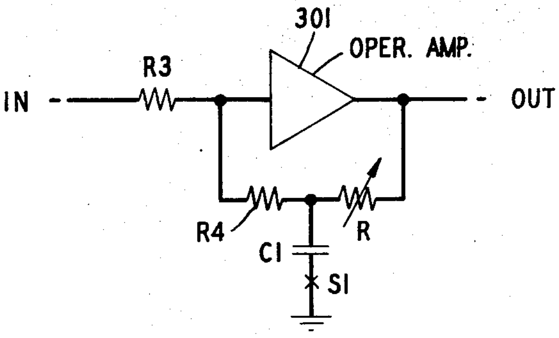
FIG. 3 is a schematic circuit diagram of the equalizer circuit shown in block form in FIG. 1.

From the AGC and noise suppressor or discriminator circuit 102 the signal is applied to a transmit equalizer 103. In accordance with the invention, a modified operational amplifier of the general form shown in FIG. 3 is employed to effect transmit equalization. An operational amplifier is a standard circuit building block and typically comprises two or more stages of amplification, indicated by the amplifier 301 in FIG. 3, with a negative feedback control path, indicated in FIG. 3 by the path which includes a variable resistor R and a fixed resistor R4. Input resistance is indicated by a resistor R3. Operational amplifiers are further characterized by a high input impedance, a low output impedance and a relatively high gain. The combination of the variable resistor R and the shunt capacitor C1 in the feedback path is employed to ensure both gain and a transmission zero to compensate for the insertion loss of a distributed RC cable when approximated by a dominant pole. It is to be understood that the variable resistor R is merely a schematic representation of an element or combination of elements in the feedback path whose resistance may be varied by the application of varying levels of DC control current. As indicated in FIG. 1, such control current is applied by way of a conducting path 110 from a regulator and power supply circuit 108 which in turn is powered from the line. In viewing the circuit of FIG. 3 as illustrative of the type of transmit equalizer 103 that is employed in accordance with the invention, the switch S1 should be disregarded inasmuch as it is employed only in the receive equalizer 107 which is described in detail hereinbelow.

Figure 4:
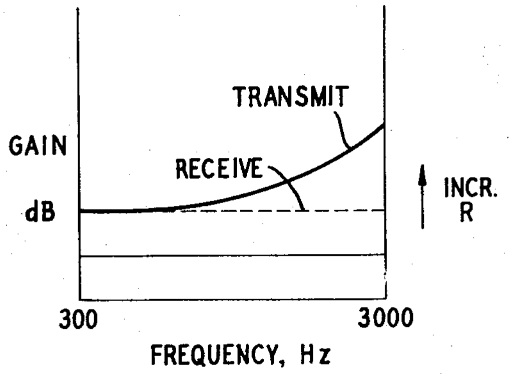
FIG. 4 is a plot of the transmission characteristics of the circuit shown in FIG. 1 in terms of gain versus frequency output.

As one example of the type of element or elements that may be used to perform the function of the variable resistor R shown in the Feedback path of the operational amplifier 301 of FIG. 3, a saturated transistor with its transmission properties controlled by the DC signal derived from the loop current would be appropriate. It should be noted at this point that the transmit equalizer 103 controls both frequency response and level. A typical curve of gain versus frequency resulting from the performance of an equalizer circuit in accordance with the invention is shown in FIG. 4. As indicated, an effective increase in the level of resistance presented by the variable resistor R serves to boost the higher frequencies.

The output of the equalizer 103 is coupled to the line by way of a hybrid 104. The hybrid is preferably noninductive and may, for example, employ the circuitry disclosed by R. E. Holtz in U.S. Pat. No. 3,440,367 issued Apr. 22, 1969. Such a hybrid may readily be designed to provide an appropriate input impedance for the set which may be on the order of 750 ohms, for example. With the equalization and AGC functions isolated from the line in the manner shown, the input impedance of the telephone set remains unaffected, whereas in conventional telephone set networks connected across the line, input impedance tends to vary with equalization.

On the receive side, gain is controlled in part by an equalizer circuit substantially identical to the operational amplifier illustrated in FIG. 3, which in this case does include the switch S1. In accordance with the invention, the switch S1 is made responsive to control current from the AGC and discriminator circuit 102 applied by way of a conducting path 114. Such control current is made available when the transmit gain is switched up by the noise suppressor as described above. As a result, voice signal transmission follows the solid curve indicated as "transmit" in FIG. 4, and sidetone follows the flat dotted curve indicated "receive." Accordingly, potentially annoying high frequency emphasis in sidetone is avoided and a more desirable sidetone response is maintained. Additionally, the prevention of an unduly emphasized high frequency response in the receive path provides an additional margin of stability which is needed when various loop impedances are encountered, thus ensuring enhanced protection against singing.

As indicated by block 106, an AGC function is also included in the receive path. In accordance with the invention, this function is provided by a balanced variolosser circuit similar to that employed on the transmit side of the set with the additional inclusion of rolloff in the lossy condition, however, in order to reduce the high frequency emphasis that occurs in many high level receive signals. The variolosser may advantageously be followed by a pair of differential emitter-followers thereby providing a low impedance balanced drive for the receiver without the need of a coupling capacitor.

The receiver RE is preferably of the electromagnetic type with a relatively high impedance such as 1500 ohms, for example, in order to facilitate effective drive from a low current circuit.

The pushbutton dial actuated multifrequency dial signal oscillator 105 may advantageously be of the general type shown by R. L. Breeden and R. M. Rickert in U.S. Pat. No. 3,424,870 issued Jan. 28, 1969, where a pair of RC tuned oscillators are employed, each consisting of a twin-T network and a unity gain amplifier feeding back from the output to the normally grounded leg of the network. Frequency selection is accomplished by adjusting one of the resistors in the network either by direct mechanical switching or by interposing solid-state device switches. The signal oscillator 105 operates at a low power level and, as shown, feeds into the speech transmit channel to take advantage of the gain in the equalizer 103 and in the hybrid 104. During dialing, the AGC and discriminator circuit 102 is in effect disabled by a common dial control signal applied by way of a conducting path 115. The same signal applied to the path 113 is employed to disable the preamplifier 101 during dialing in order to preclude interference with the dialing signals by speech or noise. This common dial signal is also applied by way of a conducting path 112, to the regulator and power supply 108, so that a higher voltage may be switched to while dial signals are being transmitted, inasmuch as multifrequency signaling requires transmission levels of approximately 12 db. higher than normal speech levels.

The purpose of the regulator and power supply current 108 is to control the direct-current voltage current characteristic of the set while maintaining a very high AC bridging impedance across the line. Based on the loop current flowing, a DC control signal for equalizer control is generated and, as indicted above, is applied to the equalizers 103 and 107 by way of the paths 110 and 111. Part of the current drawn by the regulator 108 is used to provide DC power to the various circuits in each of the other blocks, with the exception of the tone ringer 109.

The tone ringer 109 operates as shown on the line side of the switch hook SH and is a two-terminal device which operates conventionally in response to normal 20 Hz. ringing signal.

Figure 5:
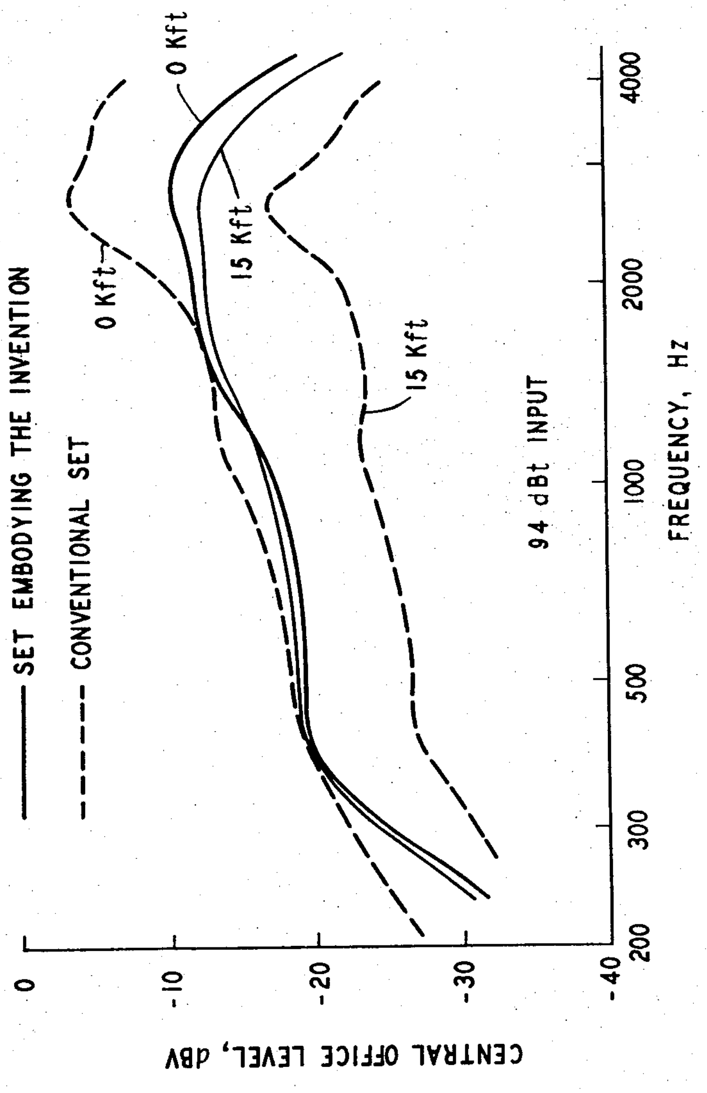
FIG. 5 is a plot of transmitting responses comparing the characteristics of a conventional set with a set in accordance with the invention.

The plot of FIG. 5 presents an overall picture of the substantial improvement in uniformity of transmission with varying loop lengths that is provided with a telephone set in accordance with the invention as compared to a conventional set. These curves were derived from tests using 26 gauge cable. Although only loop lengths of 0 and 15,000 feet are shown, results with other diverse loop lengths have been correspondingly excellent.

It is to be understood that the embodiment described herein is merely illustrative of the principles of the invention. Various modifications thereto may be effected by persons skilled in the art without departing from the spirit and scope of the invention.

What is claimed is:

1. A speech network for a telephone set comprising, in combination, a substantially nonreactive hybrid network, a receiver, first means connecting said receiver to said hybrid network, a transmitter, second means connecting said transmitter to said hybrid network, each of said first and second means including a respective equalizer circuit comprising an operational amplifier circuit, means for frequency equalization connected between the feedback path of said operational amplifier and a source of reference potential, and means responsive to a preselected output level from said transmitter for disconnecting said frequency equalization means from said first means.

2. Apparatus in accordance with claim 1 wherein each of said first and second means further includes a respective AGC circuit.

3. Apparatus in accordance with claim 1 wherein said frequency equalization means comprises a capacitor.

4. Apparatus in accordance with claim 3 wherein said disconnecting means comprises a switch.

5. A speech network for a telephone circuit comprising, in combination, a substantially nonreactive hybrid network, a receiver, first means connecting said receiver to said hybrid network, a transmitter, second means connecting said transmitter to said hybrid network, each of said first and second means including a respective equalizer circuit comprising amplitude equalization means and frequency equalization means, power supply means for deriving DC power from a telephone line, a control path connecting each of said first and second means to said power supply thereby to effect amplitude equalization, and means responsive to an output from said transmitter exceeding a preselected level for disconnecting said frequency equalization means from said equalizer of said first means thereby to inhibit singing and to ensure a substantially flat frequency characteristic in the sidetone transmission of said set.

6. Apparatus in accordance with claim 5 wherein said amplitude equalization means comprises an operational amplifier with a feedback path, said frequency equalization means comprising a reactive element connected between said feedback path and a source of reference potential, and said disconnecting means comprising a switch arranged to isolate said reactive element from said feedback path.

7. Apparatus in accordance with claim 5 wherein said first and second means each further includes a respective AGC circuit.

8. Apparatus in accordance with claim 5 wherein said second means includes a preamplifier, a dial circuit, a control path connecting said dial circuit to said preamplifier whereby said preamplifier may be disabled during dialing, a control path connecting each of said equalizer circuits to said power supply means thereby to effect equalization in terms of loop length.

9. Apparatus in accordance with claim 5 further including third means for connecting said hybrid circuit to a telephone line, ringing means, means connecting said ringing means to said third means, and means connecting said power supply means to said third means.

10. A telephone speech network comprising, in combination, a nonreactive hybrid circuit, a transmitter branch connected to said hybrid circuit, and a receiver branch connected to said hybrid circuit, each of said branches including a respective equalizer circuit, said equalizer circuit comprising an operational amplifier including a feedback path, said operational amplifier in said receiver branch including dual function means responsive to a signal in said transmitter branch above a preselected level for inhibiting a singing action in said circuit and for maintaining the sidetone in said circuit substantially flat from the standpoint of frequency irrespective of the length of the loop to which said network is connected.

11. Apparatus in accordance with claim 10 wherein said operational amplifier includes a capacitive element connected between said feedback path and a reference potential, said dual function means comprising a switch for disconnecting said capacitor from said feedback path.

12. Apparatus in accordance with claim 11 wherein said transmitter branch includes an AGC circuit and means for directing a control signal from said AGC circuit for the operation of said switch.